(12) United States Patent
Jayaraman et al.

(10) Patent No.: US 8,825,985 B2
(45) Date of Patent: Sep. 2, 2014

(54) DATA TRANSFER REDUCTION IN SCALE OUT ARCHITECTURES

(75) Inventors: Vinod Jayaraman, San Francisco, CA (US); Abhijit Dinkar, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 192 days.

(21) Appl. No.: 13/183,054

(22) Filed: Jul. 14, 2011

(65) Prior Publication Data
US 2013/0019061 A1    Jan. 17, 2013

(51) Int. Cl.
G06F 12/04 (2006.01)
G06F 12/08 (2006.01)

(52) U.S. Cl.
CPC ............ G06F 12/0864 (2013.01); G06F 12/04 (2013.01); *G06F 2212/1044* (2013.01); *G06F 2212/264* (2013.01)
USPC ...................... 711/216; 711/154; 711/E12.06

(58) Field of Classification Search
CPC . G06F 12/0864; G06F 12/0292; G06F 12/04; G06F 12/06; G06F 12/08; G06F 12/1018; G06F 2212/1044; G06F 2212/264
USPC .................... 711/154, 216, E12.06
See application file for complete search history.

(56) References Cited

U.S. PATENT DOCUMENTS

| | | | |
|---|---|---|---|
| 2006/0242155 A1* | 10/2006 | Moore et al. ................ | 707/10 |
| 2007/0156842 A1* | 7/2007 | Vermeulen et al. ......... | 709/217 |
| 2009/0013129 A1* | 1/2009 | Bondurant .................. | 711/115 |
| 2009/0327625 A1* | 12/2009 | Jaquette et al. ............. | 711/160 |
| 2010/0217948 A1* | 8/2010 | Mason et al. ............... | 711/171 |
| 2011/0022566 A1* | 1/2011 | Beaverson et al. .......... | 707/639 |
| 2011/0066628 A1* | 3/2011 | Jayaraman .................. | 707/758 |
| 2011/0125722 A1* | 5/2011 | Rao et al. .................... | 707/693 |
| 2011/0142055 A1* | 6/2011 | Feder et al. ................. | 370/400 |
| 2011/0258161 A1* | 10/2011 | Constantinescu et al. ... | 707/640 |
| 2012/0233417 A1* | 9/2012 | Kalach et al. ............... | 711/162 |

OTHER PUBLICATIONS

"The Emergence of a New Generation of Deduplication Solutions: Comparing HP StoreOnce vs. EMC Data Domain", White Paper, Edison Group, Retrieved from the Internet: < http://h18006.www1.hp.com/storage/pdfs/4AA3-8537ENW.pdf >, Nov. 2011, 25 pgs.
"The Next Generation of Deduplication—HP StoreOnce backup System", Mainline Information Systems—HP Storage Specialist, Retrieved from the Internet: < http://www.mainline.com/_web/_shared/pdfs/partner/HP-StoreOnce-Datasheet.pdf >, 4 pgs, Jan. 2012. Woo, Benjamin , "Assessing Deduplication 2.0, HP's Second-Generation StoreOnce Deduplication Appliance", IDS White Paper, Retrieved from the Internet: < http://h18006.www1.hp.com/storage/pdfs/4AA4-1784ENW.pdf >, Apr. 2012, pp. 1-6.

* cited by examiner

*Primary Examiner* — Hal Schnee
(74) *Attorney, Agent, or Firm* — Kwan & Olynick LLP

(57) ABSTRACT

Mechanisms are provided for data transfer reduction in scale out architectures. When a compute node receives a write input/output (I/O) request for a data stream, the compute node separates the data stream into chunks and generates fingerprints for the individual chunks. Fingerprints are then sent to a scale out node and compared to fingerprints of chunks already maintained at the scale out node. Write data transfers are only made for chunks not already maintained at the scale out node. For a read I/O request for a data stream, fingerprints for chunks of the data stream are requested by the compute node from a scale out node. Fingerprints received are compared to fingerprints of chunks already maintained at the compute node and read data transfers are only made for chunks not already maintained at the compute node.

22 Claims, 6 Drawing Sheets

Figure 2A

| Object Map File X 201 | | |
|---|---|---|
| Offset 203 | Index 205 | Lname 207 |
| 0K | 0.1 | NULL |
| 8K | 0.2 | NULL |
| 16K | 0.3 | NULL |

Figure 2B

| Datastore Suitcase 271 | | |
|---|---|---|
| | Data Table 251 | |
| Index 253 | Data Offset 255 | Data Reference Count 257 |
| 1 | Offset-Data Chunk A | 1 |
| 2 | Offset-Data Chunk B | 1 |
| 3 | Offset-Data Chunk C | 1 |
| | Datastore | |
| | Data 261 | Last File 263 |
| 1 | Data Chunk A | File X 201 |
| 2 | Data Chunk B | File X 201 |
| 3 | Data Chunk C | File X 201 |

Figure 3

| Dictionary 301 ||
|---|---|
| Fingerprint 311 | Storage Location 321 |
| a | Location 323 |
| b | Location 325 |
| c | Location 327 |

| Dictionary 351 ||
|---|---|
| Fingerprint 361 | Storage Location 371 |
| i | Location 373 |
| j | Location 375 |
| k | Location 377 |

DATA TRANSFER REDUCTION IN SCALE OUT ARCHITECTURES

TECHNICAL FIELD

The present disclosure relates to data transfer reduction in scale out architectures.

DESCRIPTION OF RELATED ART

In scale out storage architectures, each compute node has local storage only accessible to that compute node. Multiple compute nodes are linked using various network interfaces and the collection of storage attached to each of the multiple compute nodes is accessible from any particular compute node. To increase storage capacity in a scale out storage architecture, a scale out node with its own local storage resources can be added and linked to a particular compute node. When an I/O request is received at a particular compute node, that particular compute node may have to take an additional step of accessing data from the scale out node.

However, in a variety of systems including optimization systems, transferring large amounts of data across these network interfaces can be processor and network resource intensive. Data transfers may entail significant latency based delay and may consume valuable network resources.

Consequently, techniques and mechanisms are provided to reduce data transfers in a scale out architecture.

BRIEF DESCRIPTION OF THE DRAWINGS

The disclosure may best be understood by reference to the following description taken in conjunction with the accompanying drawings, which illustrate particular embodiments of the present invention.

FIG. 2A illustrates a particular example of an object map.

FIG. 2B illustrates a particular example of a datastore suitcase.

FIG. 3 illustrates a particular example of a dictionary.

DESCRIPTION OF PARTICULAR EMBODIMENTS

Figure 1:
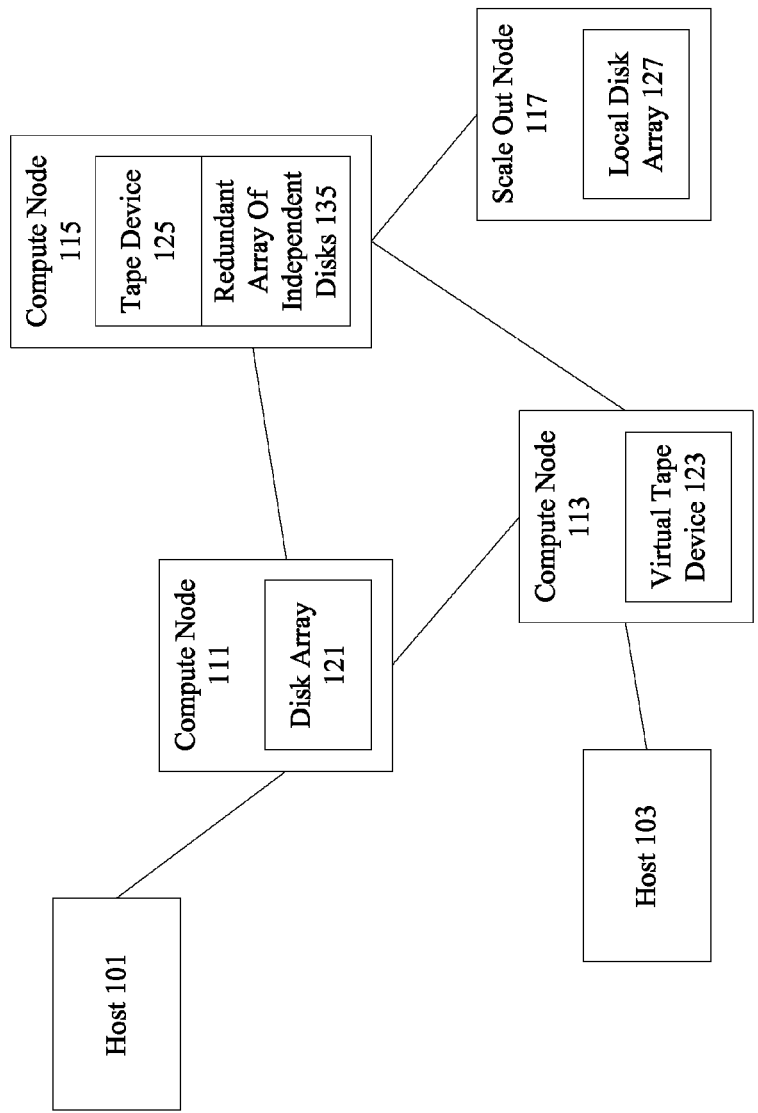
FIG. 1 illustrates a particular example of network that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular compute nodes and network interfaces. However, it should be noted that the techniques and mechanisms of the present invention apply to a variety of different compute nodes and network interfaces. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for data transfer reduction in scale out architectures. When a compute node receives a write input/output (I/O) request for a data stream, the compute node separates the data stream into chunks and generates fingerprints for the individual chunks. Fingerprints are then sent to a scale out node and compared to fingerprints of chunks already maintained at the scale out node. Write data transfers are only made for chunks not already maintained at the scale out node. For a read I/O request for a data stream, fingerprints for chunks of the data stream are requested by the compute node from a scale out node. Fingerprints received are compared to fingerprints of chunks already maintained at the compute node and read data transfers are only made for chunks not already maintained at the compute node.

EXAMPLE EMBODIMENTS

In scale out storage architectures, each compute node has its own local storage, only accessible by that particular compute node. However, the collection of all the compute nodes needs to present the notion of a global pool of data, accessible from any node. A scale out node can be added to introduce additional storage and processing capacity. A scale out node can be connected to an existing compute node.

In traditional scale out storage architectures, the compute node that receives an input/output (I/O) request may have to take an additional step of requesting data from the scale out node that actually contains the data corresponding to the I/O request if the data is not local to the compute node. The additional step typically involves transfer of a large amount of data over a network.

According to various embodiments, a dictionary is maintained that maps fingerprints, such as checksums or hashes, to locations of various data chunks. The dictionary is used to identify duplicate chunks. In many systems, multiple dictionaries may be created where a compute node may have already identified a redundant chunk but a scale out node is not yet aware of it because the dictionary is not shared between the two nodes. The scale out node may or may not have a chunk that the compute node is accessing.

According to various embodiments, when a compute node receives an I/O request for a chunk of data, it may not know whether a scale out node has a copy of that chunk. Consequently, the techniques and mechanisms of the present invention contemplate using a negative acknowledgement (NACK) protocol with data chunk fingerprints to determine chunk availability and reduce data transfers. Instead of a compute node sending an entire data chunk to a scale out node, the compute node sends only a fingerprint of the chunk to the scale out node. The fingerprint may be an identifier such as a hash or checksum that is significantly smaller than the actual data chunk. The scale out node then uses the fingerprint to determine whether the chunk is stored locally at the scale out node. Only data chunks that are not yet maintained at the scale out node are transmitted from the compute node to the scale out node, thus reducing the amount of network traffic. Whether or not the data chunk is transmitted, reference counts and references may be updated based on the write to the scale out node.

During read operations, the converse occurs. When a compute node requests a data stream, the scale out node can send only data stream chunk fingerprints. The compute node can then make subsequent requests for data chunks having fingerprints that the compute node is unaware of.

FIG. 1 illustrates a particular example of a network that can use the techniques and mechanisms of the present invention. Hosts 101 and 103 are connected to compute nodes 111, 113, and 115 as well as scale out node 117. It should be noted that scale out node 117 may be configured in the same manner as any compute node 111, 113, and 115. However, to increase storage capacity or processing capacity, scale out node 117 may have been added to a network already including compute nodes 111, 113, and 115. According to various embodiments, various compute and scale out nodes include active and/or passive storage resources. In particular embodiments, compute node 111 includes a locally attached disk array 121. Compute node 113 includes a virtual tape device 123. Compute node 115 includes a tape device 125 as well as a redundant array of independent disks (RAID) 135. Scale out node 117 includes disk array 127. Each of the compute nodes 111, 113, and 115 as well as scale out node 117 includes locally connected storage resources that may need to be globally accessible.

Hosts 101 and 103 may include computer systems, application servers, devices, etc. A network connecting the hosts and compute nodes may be a single network or a combination of different networks. According to various embodiments, each host 101 and 103 runs applications that may require accessing storage capabilities of compute nodes 111, 113, and 115 as well as scale out node 117.

According to various embodiments, hosts 101 and 103 may be connected to compute and scale out nodes 111, 113, 115, and 117 using file level protocols such as Server Message Block (SMB), Network File System (NFS), or the Andrew File System (AFS) that are capable of providing network attached storage (NAS) to heterogeneous clients. In particular examples, NAS includes both a file system and storage. SMB, NFS, and AFS generally allow hosts 101 and 103 access data at the file level. The compute and scale out nodes 111, 113, 115, and 117 then use block level protocols such as serial advanced technology attachment (SATA), Internet Small Computer Systems Interface (iSCSI), and storage area networks (SANs) to access individual blocks of data.

Block level protocols generally do not provide any file system capabilities to file servers but instead leave file system operations on the compute node side. The data accessed by the compute and scale out nodes 111, 113, 115, and 117 may be physically stored on attached storage 121, 123, 125, 127, and 135.

According to various embodiments, a data fingerprinting mechanism may be implemented at hosts 101 and 103 or at compute and scale out nodes 111, 113, 115, and 117. The data fingerprinting mechanism generates identifiers such as hashes or checksums of chunks of data. The chunks may be entire files, fixed size segments, variable size segments, etc. Chunk sizes and boundaries may be determined using a variety of available mechanisms. The data fingerprinting mechanism generates a fingerprint of a chunk prior to reading the chunk from or writing the chunk to a scale out node.

FIG. 2A illustrates a particular example of a mechanism for delineating data chunks. FIG. 2B illustrates a particular example of a mechanism for managing data chunks. It should be noted that although a particular mechanism is described, a wide variety of mechanisms can be used. According to various embodiments, object map file X 201 includes offset 203, index 205, and lname 207 fields. In particular embodiments, each chunk in the object map for file X is 8K in size. In particular embodiments, each data chunk has an index of format <Datastore Suitcase ID>. <Data Table Index>. For example, 0.1 corresponds to suitcase ID 0 and datatable index 1, while 2.3 corresponds to suitcase ID 2 and database index 3. The chunks corresponding to offsets 0K, 8K, and 16K all reside in suitcase ID 0 while the data table indices are 1, 2, and 3. The lname field 207 is NULL in the object map because each chunk has not previously been referenced by any file.

FIG. 2B illustrates one example of a datastore suitcase corresponding to the object map file X 201. According to various embodiments, datastore suitcase 271 includes an index portion and a data portion. The index section includes indices 253, data offsets 255, and data reference counts 257. The data section includes indices 253, data 261, and last file references 263. According to various embodiments, arranging a data table 251 in this manner allows a system to perform a bulk read of the index portion to obtain offset data to allow parallel reads of large amounts of data in the data section.

According to various embodiments, datastore suitcase 251 includes three offset reference count pairs which map to the data chunks of the object map file X 201. In the index portion, index 1 corresponding to data in offset-data chunk A has been referenced once. Index 2 corresponding to data in offset-data chunk B has been referenced once. Index 3 corresponding to data in offset-data chunk C has been referenced once. In the data portion, index 1 includes data chunk A and a reference to File X 201 which was last to place a reference on the data chunk A. Index 2 includes data chunk B and a reference to File X 201 which was last to place a reference on the data chunk B. Index 3 includes data chunk C and a reference to File X 201 which was last to place a reference on the data chunk C.

FIG. 3 illustrates multiple dictionaries assigned to different fingerprints. According to various embodiments, the fingerprints values are checksums, SHA/SHA1/SHA-256 hash values. In particular embodiments, dictionary 301 is a deduplication dictionary used by a first node and includes fingerprint ranges from 0x0000 0000 0000 0000-0x0000 0000 FFFF FFFF. Dictionary 351 is used by a second node and includes fingerprint ranges from 0x0000 0001 0000 0000-0X0000 0001 FFFF FFFF. Fingerprints 311 within the range for dictionary 301 are represented by symbols a, b, and c for simplicity. Fingerprints 361 within the range for dictionary 351 are represented by symbols i, j, and k for simplicity. According to various embodiments, each fingerprint in dictionary 301 is mapped to a particular storage location 321 such as location 323, 325, or 327. Each fingerprint in dictionary 351 is mapped to a particular storage location 371 such as location 373, 375, and 377.

Having numerous small chunks increases the likelihood that duplicates will be found. However, having numerous small chunks decreases the efficiency of using the dictionary itself as well as the efficiency of using associated object maps and datastore suitcases.

Figure 4:
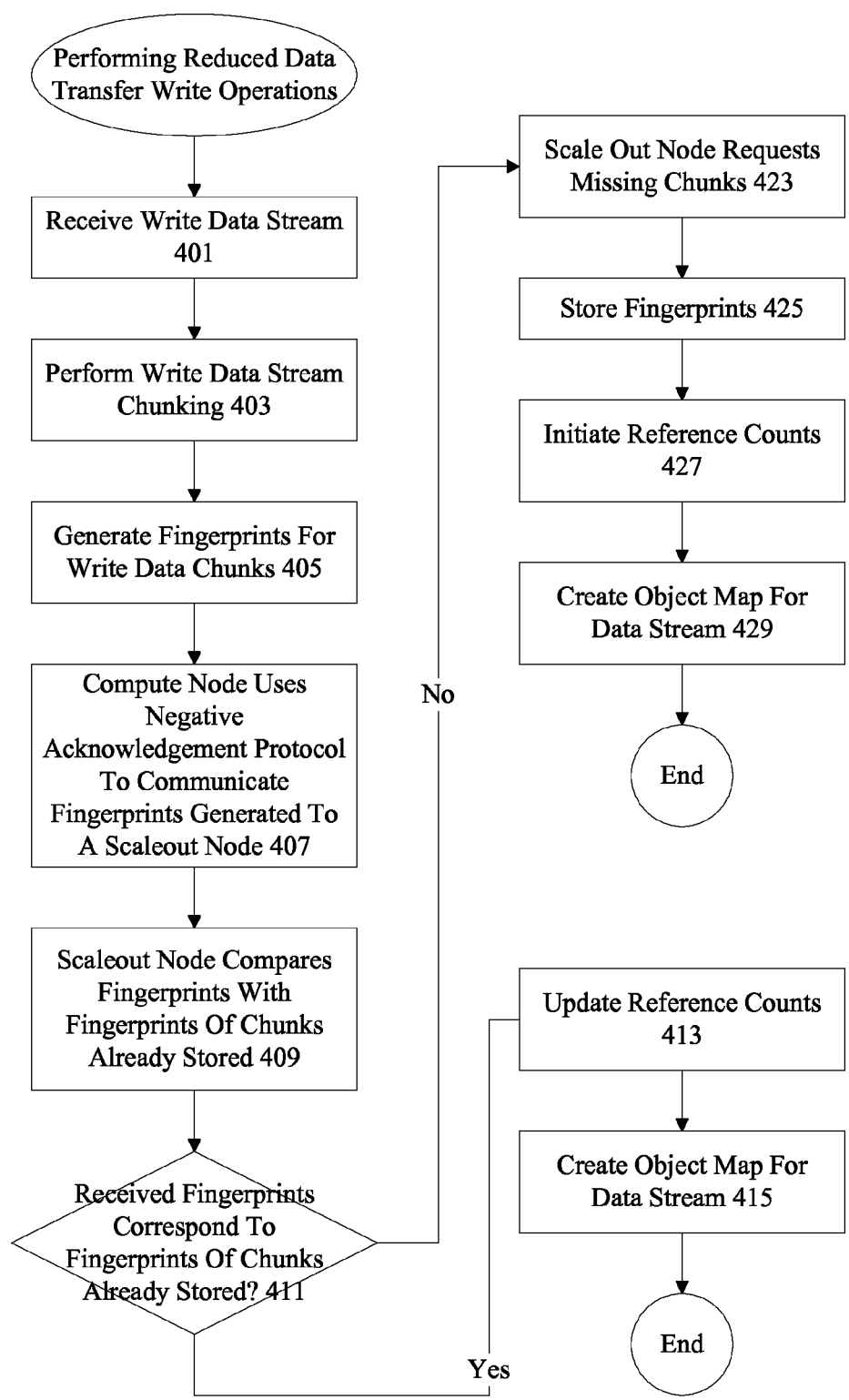
FIG. 4 illustrates a particular example of a technique for performing reduced data transfer write operations.

FIG. 4 illustrates a particular example of a technique for performing reduced data transfer write operations. According to various embodiments, a compute node receives a write data stream at 401. In particular embodiments, the compute node performs write data stream chunking at 403. The compute node may divide the write data stream into fixed size chunks or variable size chunks. The compute node may also perform analysis to identify chunk boundaries. In particular embodiments, the data stream is divided into chunks to allow for deduplication, although chunking may also be useful in a variety of other applications. At 405, fingerprints are generated for the chunks. Fingerprints may be checksums, hash values, or any other sequence that can be used to identify individual chunks.

At 407, the compute node uses a negative acknowledgement (N-ACK) protocol to communicate the fingerprints it has just calculated. The scale out node receives the fingerprints and compares the fingerprints it receives with the fingerprints of chunks locally stored at 409. If it is determined that received fingerprints correspond to fingerprints already stored at 411, reference counts are updated for the chunks at 413 and an object is created for the data stream at 415.

If it is determined that received fingerprints do not correspond to fingerprints already stored at 411, the scale out node requests the missing chunks at 423. The scale out node also stores the fingerprints at 425. Reference counts are initiated at 427 and an object map is created for the data stream at 429.

Figure 5:
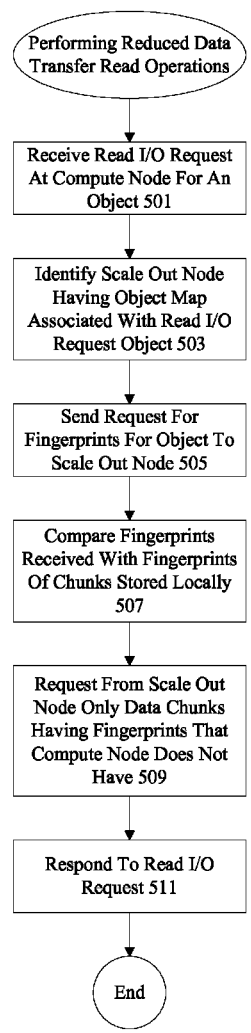
FIG. 5 illustrates a particular example of a technique for performing reduced data transfer read operations.

FIG. 5 illustrates a particular example of a technique for performing reduced data transfer read operations. At 501, a read I/O request for an object is received at a compute node. According to various embodiments, the compute node identifies a scale out node having an object map for the read I/O request object at 503. In particular embodiments, the compute node sends fingerprints requests for the object to the scale out node at 505. According to various embodiments, the compute node compares fingerprints received from the scale out node with fingerprints corresponding to chunks stored locally at 507.

According to various embodiments, the compute node requests from the scale out node only data chunks having fingerprints that the compute node does not have at 509. The compute node can then respond to the read I/O request 511 using data from the scale out node as well as using data locally stored. By not transmitting data chunks from the scale out node to the compute node that the compute node already has, network bandwidth utilization can be significantly reduced.

Figure 6:
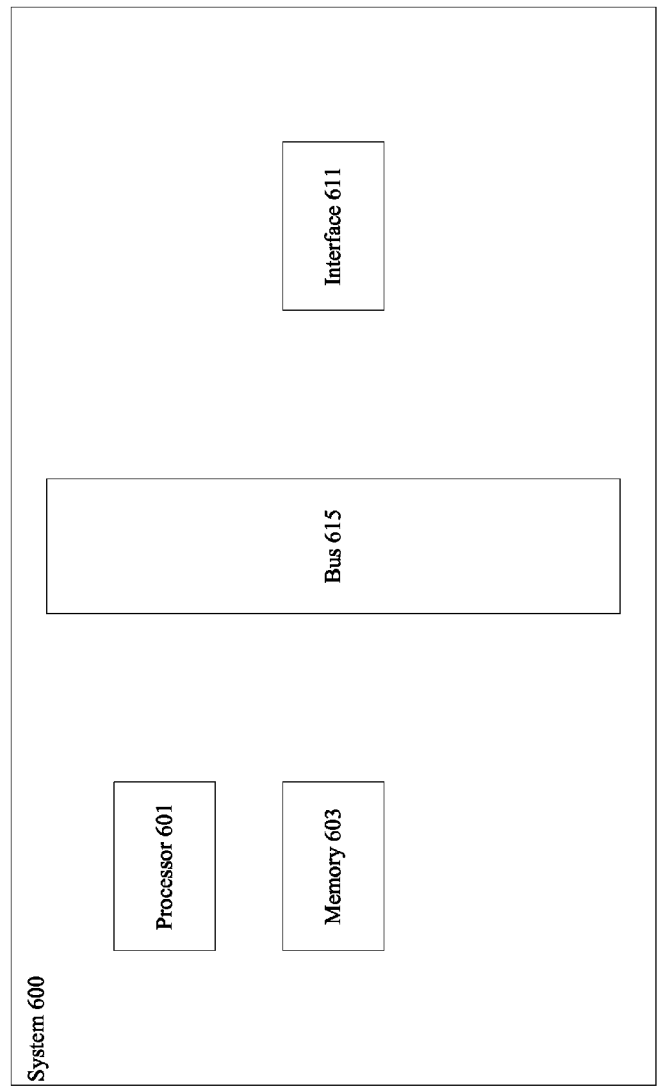
FIG. 6 illustrates a particular example of a computer system.

A variety of devices and applications can implement particular examples of the present invention. FIG. 6 illustrates one example of a computer system. According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
  receiving a data stream at a compute node, the compute node having compute node local storage resources;
  separating the data stream into a plurality of chunks, including a first chunk and a second chunk;
  generating a plurality of fingerprints for the plurality of chunks, including the first chunk and the second chunk;
  transmitting the plurality of fingerprints to a scale out node, the scale out node having scale out node local storage resources, wherein the scale out node compares the plurality of fingerprints with fingerprints corresponding to chunks maintained in the scale out node local storage resources;
  creating an object map for the data stream based on a determination of whether fingerprints in the plurality of fingerprints correspond to fingerprints already stored in the scale out node; and creating a datastore suitcase corresponding to the object map including an index portion and a data portion, the data portion holding a plurality of datastore indices corresponding to the plurality of chunks and a last file entry for each of the plurality of chunks, each last file entry storing an identifier of a file which last placed a reference to the corresponding chunk.

2. The method of claim 1, wherein the plurality of fingerprints are a plurality of checksums for the plurality of chunks.

3. The method of claim 1, wherein the plurality of fingerprints is a plurality of hash values for the plurality of chunks.

4. The method of claim 1, wherein compute node local storage resources comprise disk arrays.

5. The method of claim 1, wherein the data stream is an object.

6. The method of claim 1, wherein the scale out node sends a negative acknowledgement (N-ACK) to the compute node for fingerprints corresponding to chunks not maintained in the scale out node local storage resources.

7. The method of claim 6, wherein the compute node transmits to the scale out node chunks not maintained in scale out node local storage resources.

8. The method of claim 1, wherein the compute node is connected to the scale out node using a network interface.

9. A system, comprising:
   an interface configured to receive a data stream at a compute node, the compute node having compute node local storage resources;
   a processor configured to separate the data stream into a plurality of chunks and generate a plurality of fingerprints for the plurality of chunks, the plurality of chunks including a first chunk and a second chunk;
   wherein the plurality of fingerprints are transmitted to a scale out node, the scale out node having scale out node local storage resources, wherein the scale out node compares the plurality of fingerprints with fingerprints corresponding to chunks maintained in the scale out node local storage resources;
   wherein the processor is further configured to create an object map for the data stream based on a determination of whether fingerprints in the plurality of fingerprints correspond to fingerprints already stored in the scale out node; and
   wherein the processor is further configured to create a datastore suitcase corresponding to the object map including an index portion and a data portion, the data portion holding a plurality of datastore indices corresponding to the plurality of chunks and a last file entry for each of the plurality of chunks, each last file entry storing an identifier of a file which last placed a reference to the corresponding chunk.

10. The system of claim 9, wherein the plurality of fingerprints are a plurality of checksums for the plurality of chunks.

11. The system of claim 9, wherein the plurality of fingerprints is a plurality of hash values for the plurality of chunks.

12. The system of claim 9, wherein compute node local storage resources comprise disk arrays.

13. The system of claim 9, wherein the data stream is an object.

14. The system of claim 9, wherein the scale out node sends a negative acknowledgement (N-ACK) to the compute node for fingerprints corresponding to chunks not maintained in the scale out node local storage resources.

15. The system of claim 14, wherein the compute node transmits to the scale out node chunks not maintained in scale out node local storage resources.

16. The system of claim 9, wherein the compute node is connected to the scale out node using a network interface.

17. A method, comprising:
   receiving a read input/output (I/O) request for a data stream at a compute node, the compute node having compute node local storage resources;
   identifying a scale out node having an object map corresponding to the data stream, the object map further corresponding to a datastore suitcase including an index portion and a data portion, the data portion holding a plurality of datastore indices corresponding to a plurality of chunks, the chunks corresponding to the data stream, and a last file entry for each of the plurality of chunks, each last file entry storing an identifier of a file which last placed a reference to the corresponding chunk;
   requesting a plurality of fingerprints for the data stream from the scale out node;
   comparing the plurality of fingerprints with fingerprints corresponding to chunks maintained in compute node local storage resources;
   requesting from the scale out node only the chunks not maintained in the compute node local storage resources.

18. The method of claim 17, wherein the plurality of fingerprints are a plurality of checksums for the plurality of chunks.

19. The method of claim 17, wherein the plurality of fingerprints is a plurality of hash values for the plurality of chunks.

20. The method of claim 17, wherein compute node local storage resources comprise disk arrays.

21. The method of claim 17, wherein the data stream is an object.

22. The method of claim 17, wherein the compute node is connected to the scale out node using a network interface.

* * * * *